US007022417B2

(12) United States Patent
Takagi et al.

(10) Patent No.: US 7,022,417 B2
(45) Date of Patent: Apr. 4, 2006

(54) METAL BELT AND COATED BELT

(75) Inventors: Masao Takagi, Tokyo (JP); Goki Inukai, Tokyo (JP)

(73) Assignee: Nitto Kogyo Co., Ltd., Tokyo (JP)

( * ) Notice: Subject to any disclaimer, the term of this patent is extended or adjusted under 35 U.S.C. 154(b) by 66 days.

(21) Appl. No.: 10/713,103

(22) Filed: Nov. 17, 2003

(65) Prior Publication Data

US 2004/0105996 A1 Jun. 3, 2004

(30) Foreign Application Priority Data

Dec. 2, 2002 (JP) ............................ 2002-350313
Dec. 2, 2002 (JP) ............................ 2002-350314

(51) Int. Cl.
*B32B 15/00* (2006.01)
*C25D 1/02* (2006.01)

(52) U.S. Cl. ...................... 428/606; 428/607; 428/680; 428/457; 428/935; 205/73

(58) Field of Classification Search ................ 428/586, 428/606, 607, 680, 34.1, 457; 205/73; 399/329, 399/333
See application file for complete search history.

(56) References Cited

U.S. PATENT DOCUMENTS

| | | | | |
|---|---|---|---|---|
| 6,564,033 | B1 | 5/2003 | Zhou et al. | |
| 2002/0146259 | A1 * | 10/2002 | Zhou et al. | 399/329 |

FOREIGN PATENT DOCUMENTS

| | | | |
|---|---|---|---|
| JP | 2002-148975 | | 5/2002 |
| JP | 2002-206188 | * | 7/2002 |
| JP | 2002-241984 | | 8/2002 |

* cited by examiner

*Primary Examiner*—John J. Zimmerman

(74) *Attorney, Agent, or Firm*—Westerman, Hattori, Daniels & Adrian, LLP

(57) ABSTRACT

A metal belt of the present invention is formed to be endless by electroforming, has a crystal orientation in which a crystal orientation ratio $I_{(200)}/I_{(111)}$ is not less than 80 and not more than 250, mainly contains nickel, and has an excellent durability.

6 Claims, 2 Drawing Sheets

METAL BELT AND COATED BELT

CROSS-REFERENCE TO RELATED APPLICATIONS

This application is based upon and claims the benefit of priority from the prior Japanese Patent Applications No. 2002-350313, filed Dec. 2, 2002; and No. 2002-350314, filed Dec. 2, 2002, the entire contents of both of which are incorporated herein by reference.

BACKGROUND OF THE INVENTION

1. Field of the Invention

This invention relates to an endless metal belt, and a coated belt obtained by coating the metal belt, which are used for image forming apparatuses, such as copying machines, facsimiles, and laser beam printers.

2. Description of the Related Art

To meet demands such as miniaturization, reduction in the power consumption, and increase in the speed of printing and copying of image forming apparatuses, there has been adopted a belt fixing method, in which an endless fixing belt (endless belt or tube) is driven to be rotated instead of a fixing roller. A fixing belt has the advantage that waiting time after turning on the power is reduced, since a toner image on a transfer member can be almost directly heated and fixed, with only a thin belt intervening, by bringing heating means into contact with an internal surface of the fixing belt.

In such a fixing belt, a release layer is formed by coating directly, or with an elastic layer intervening, on an endless metal belt base material. In most cases, a release layer is made of a heat-resistant resin having excellent heat-resistance and releasing property, such as fluoroplastics. Since a release layer made of heat-resistant resin lacks elasticity, in most cases an elastic layer is disposed between the metal belt base material and the release layer, to improve fixing property and image quality. If the release layer is a rubber layer having elasticity and releasing property, such as a silicone rubber layer, an intermediate elastic layer can be omitted. As a transfer belt, a charged belt, and a conveyer belt, used is an endless belt made of a metal belt base material alone, or of a metal belt base material and a release layer.

U.S. Pat. No. 6,564,033, Jpn. Pat. Appln. KOKAI Pub. No. 2002-241984 and Jpn. Pat. Appln. KOKAI Pub. No. 2002-148975 disclose an endless nickel belt formed as a metal belt base material by using electroforming.

U.S. Pat. No. 6,564,033 discloses an electroformed nickel belt, in which a plane (200) is preferentially grown, in which the electroformed nickel has a crystal orientation ratio $I_{(200)}/I_{(111)}$ of 3 or more, preferably 8 or more, and a carbon content of electroformed nickel is not more than 0.08 wt %.

Jpn. Pat. Appln. KOKAI Pub. No. 2002-241984 discloses an electroformed nickel belt containing at least one additive element selected from the group consisting of thallium, lead, bismuth, tin, calcium, zinc, aluminum, silicon, and antimony.

Jpn. Pat. Appln. KOKAI Pub. No. 2002-148975 discloses an electroformed nickel belt whose carbon content is 0.01 to 0.1 wt %.

However, conventional nickel belts do not have sufficient fatigue strength at high temperature, and lack durability. In the belt fixing method, a belt is repeatedly bent in a fixing nip part and an inlet and outlet thereof with rotation of the belt itself, and torsion is caused on the belt by difference in the peripheral speed. Therefore, the belt tends to be mechanically fatigued, and has a problem in heat resistance and durability. For example, its endurance time is shortened by increasing the fixing temperature. In particular, since the fixing nip part of a high-speed printer is wide and has a high pressing force, mechanical force applied on the belt increases, and a high fixing temperature is set. Therefore, the conventional belts tend to be broken for a relatively short time, and must be replaced with high frequency.

Further, in a belt having a high carbon content, a plating film has an increased internal stress. Therefore, its releasing property decreases, an electroformed product is not easily removed from a matrix, and a part of the electroformed product may be separated from the matrix during electrolysis due to excessive internal stress.

BRIEF SUMMARY OF THE INVENTION

The object of the present invention is to provide a long-life metal belt and a coated belt, which have an excellent durability, an electroformed product of which can be easily removed from an electroforming matrix, and which prevent partial separation from the matrix.

(Metal Belt)

A metal belt being formed to be endless by electroforming, and mainly containing nickel, wherein the belt comprises a crystal orientation in which a crystal orientation ratio $I_{(200)}/I_{(111)}$ is not less than 80 and not more than 250.

Properties necessary for a fixing belt are basic properties, such as heat resistance to a maximum heating temperature and mechanical strength. In addition, to further increase durability, a fixing belt is required to have an excellent fatigue strength at high temperature. In the metal belt of the present invention, a plane (200) is preferentially grown, and thereby fatigue resistance, that is, durability at high temperature is improved. A belt made by preferentially growing the plane (200) in crystal growth resists deterioration of flexibility and strength of the belt even if it is subjected to high temperature, which is advantageous as a fixing belt used at high temperature.

In the present invention, "the plane (200) is preferentially grown" means that the crystal is preferentially grown to a plane (200) parallel to the surface of a matrix. The crystal orientation ratio $I_{(200)}/I_{(111)}$ is defined as a ratio (peak strength ratio) of peak strength of a surface (111) to peak strength of a plane (200) measured by wide-angle X-ray diffraction. A d value of the plane (200) is 0.17620 nm, and a d value of the plane (111) is 0.20340 nm.

Further, in the present invention, the crystal orientation ratio $I_{(200)}/I_{(111)}$ is set to from 80 to 250 inclusive 80 and 250, and thereby a sufficient durability is ensured against a high-temperature heating cycle. The inventor(s) of the present invention have diligently researched an influence of the crystal orientation ratio $I_{(200)}/I_{(111)}$ on durability of belt, and consequently have obtained new information as to correlation between them as shown in FIG. 3 and Table 1. According to the information, the number of repetition durability times of the belt obtained by a heat fatigue test is about 130,000 in samples H and I, whose crystal orientation ratios $I_{(200)}/I_{(111)}$ are less than 50, and does not reach 200,000 being the acceptable quality level. However, the numbers of repetition durability times of samples A–G, whose crystal orientation ratios $I_{(200)}/I_{(111)}$ are 113, 114, 132, 147, 169, 198 and 246, respectively, are much larger than 200,000, the acceptable quality level.

The crystal orientation ratio $I_{(200)}/I_{(111)}$ is influenced by various parameters, such as the composition of nickel pellet being starting material, the composition and the temperature of nickel bath, the current density, and the state of surface of a matrix, etc. Therefore, in prior art, it is difficult to intentionally set the crystal orientation ratio to a desired value at the manufacturing stage. If the crystal orientation ratio $I_{(200)}/I_{(111)}$ is small, in particular, 50 or less, the belt tends to be fatigued by heat cycles, and has insufficient durability. Patent documents say that sulfur and organic substances obtained from a brightener in an electrolytic bath are deposited as eutectoid together with crystal growth of nickel, and it causes disadvantages in the high-temperature durability of the belt. In addition, electroformed nickel tends to have a cristallite structure and thus has a high hardness, and it is inferred that it can cause a problem with flexibility of the belt. The inventor(s) of the present invention inferred that a crystal structure with a small crystal orientation ratio $I_{(200)}/I_{(111)}$ is susceptible to thermal degradation.

In the present invention, a carbon content of a metal belt mainly composed of nickel is 0.03 to 0.10 wt %. By restricting the carbon content within the above range, it is possible to more easily obtain an electroformed nickel belt whose hardness and strength do not deteriorate due to thermal aging, while a standard hardness required as an endless metal belt base material is maintained. If the carbon content is less than 0.03 wt %, the crystal orientation ratio is lowered and the durability is reduced. The carbon content exceeding 0.10 wt % increases the internal stress of the plating film and lowers the releasing property. Therefore, it may be difficult to remove an electroformed product from a matrix, or a part of the electroformed product may be separated from the matrix during electrolysis. However, if a matrix releasing technique is further improved, it is inferred that a belt with a carbon content up to about 0.14 wt % can be manufactured. If the carbon contents exceeds 0.14 wt %, the plating film itself is not soundly formed. The correlation between the carbon content and the number of repetition durability times is as shown in FIG. 4 and Table 1 shown later.

Further, there is a correlation between the carbon content and the crystal orientation ratio as shown in FIG. 5 and Table 1. The crystal orientation ratio depends heavily on the carbon content. As shown in FIG. 5, the peak value of the crystal orientation ratio (the peak value is estimated to be about 250 since the actual measured peak value was 246) exists in the vicinity of a point where the carbon content is 0.06 wt %. The crystal orientation ratio lowers, with the carbon content of any value other than the peak value. If the belt has an excessive carbon content much higher than 0.10 wt %, it is inferred that the crystal orientation ratio is lower than 80. Further, if the carbon content exceeds 0.10%, the internal stress increases, crack occurs, and thus a part of the product may be separated from the matrix. Therefore, a stable crystal growth cannot be expected.

The metal belt (or metal base material) of the present invention is substantially free of manganese (0.00 wt %; lower than limit of detection). This is because containing manganese prevents increases in the crystal orientation ratio and in fatigue resistance under high-temperature heat cycles, although the reason is unclear.

The metal belt often contains impurities, such as sulfur, cobalt and carbon generated from components of a nickel plating bath. If the belt contains a large amount of impurities such as sulfur and cobalt, it is difficult to grow crystals of nickel in orderly layers in plating, and the crystal orientation ratio decreases. Adjusting the content of each of the impurities can further improve the properties of the metal belt.

The sulfur content of the metal belt is preferably adjusted to be less than 0.03 wt %. The sulfur content is more preferably 0.01 wt % or less. If the sulfur content is too high, sulfur is deposited on the grain boundary of nickel under continuous heating conditions, and causes decrease in hardness and strength. Although the lower limit of the sulfur content is 0 wt % (0.00 wt %; lower than limit of detection), in the case of using sulfur-containing compound (for example, a primary brightener) as an ingredient of the nickel plating bath, generally the sulfur content is 0.01 to 0.09 wt %, 0.001 to 0.009 wt % if reduced as much as possible. In the case of using an electrolytic bath of sulfamic acid without using a brightener, the sulfur content is 0.0001 to 0.0009 wt %.

The sulfur content can be reduced by reducing the amount of use of sulfur-containing compounds, such as a brightener. Although sulfur in the metal belt is an indispensable component which reduces electrodeposition stress and improves manufacturing accuracy, it also damages the flexibility and the elasticity at high temperature and has a great influence on break due to metal fatigue. If the belt contains too much sulfur, there are cases where sulfur forms a thin brittle film around the nickel grain boundary at high temperature and makes the grain boundary of the electroformed nickel discontinuous. In such a case, the belt may be subject to brittle fracture. In the meantime, if the sulfur content is too low, the releasing property from the matrix and the strength of the belt may lowers. The normal lower limit of the sulfur content is 0.001 to 0.009 wt %.

Nickel or nickel alloy, whose carbon content and sulfur content fall within the above respective ranges, and which is substantially free of manganese and cobalt being an inevitable impurity element, tends to have a crystal structure, in which a plane (200) is preferentially grown in crystal growth of the electroformed nickel and the crystal orientation ratio $I_{(200)}/I_{(111)}$ is 100 or more. Further, if the sulfur content is low, a plane (200) is more likely to be preferentially grown in crystal growth.

The normal content of the other inevitable impurities is 0.01 wt % or less. In the present invention, the content of the inevitable impurities other than nickel is preferably reduced as much as possible. If the crystal orientation ratio $I_{(200)}/I_{(111)}$ is too low, the durability tends to decrease.

The metal belt is manufactured by electroforming process, using a matrix of stainless steel, etc. as a cathode. In this process, a publicly-known nickel electrolytic bath such as sulfamic acid bath can be used as an electrolytic bath, and additives such as a pH adjuster, pit inhibitor and brightener may be added to the bath. An example of the nickel electrolytic bath is a nickel electrolytic solution containing nickel sulfamate as a main component, and containing 0–30 g/l of nickel chloride or nickel bromide, and 30–45 g/l of boric acid. The concentration of sulfamate nickel can be selected from low to high concentrations according to the purpose. Nickel sulfamate tetrahydrate of 450 g/l is called a normal bath, and that of 600 g/l is called a nickel speed bath or a high-concentration bath. A bath of a concentration lower or higher than the above can be used.

By controlling the temperature of the electrolytic bath and the cathode current density and the like, an electroformed nickel made of a desired nickel or nickel alloy can be obtained. The electroforming process is preferably performed with an electrolytic bath temperature of about 45 to 60° C., and a cathode current density of about 1 to 10 A/$dm^2$, although they vary according to the electrolytic bath to be used. Additives called a primary brightener (stress reducing agent) including saccharin, sodium benzenesulfonate, and sodium naphthalenesulfonate, etc. and a secondary brightener including 2-butyne-1,4-diol, coumarin, and diethyltriamine, etc. are added to the electrolyte bath. Thereby, the stress in electrodeposition of the electroformed nickel is reduced, and the molding accuracy is improved. By adjusting the amounts of the additives added in this process, the sulfur content and the carbon content in the electroformed nickel can be set within the above ranges. The contents of the deposited sulfur and carbon can be adjusted by the process conditions, such as concentrations of the primary and secondary brighteners in the bath, the current density, and the temperature of the bath.

To increase the crystal orientation ratio $I_{(200)}/I_{(111)}$, it is necessary to use a specific bath composition together with a specific manufacturing process. The specific bath composition contains predetermined amounts of the primary brightener and the secondary brightner, is substantially free of manganese, and cobalt being inevitable impurity limited to be less than 5 mg/l. In the manufacturing process, the current density in electroforming is properly adjusted, and thereby a plane (200) can be preferentially grown, and the peak intensity of the plane (200) measured by X-ray diffraction is enhanced.

The thickness of the metal belt is greater than a skin depth expressed by the formula below, preferably 1 μm to 100 μm. The skin depth σ[m] is represented by the formula below, with the frequency f (Hz), magnetic permeability μ, and specific resistance ρ(Ωm) of an exciting circuit:

$$\sigma[m]=503\times(\rho/f\mu)^{1/2}$$

This shows absorption depth of electromagnetic waves used in electromagnetic induction. The strength of electromagnetic waves at a deeper portion is not more than 1/e. Conversely, most energy is absorbed up to this depth. If the thickness of the belt is less than 1 μm, the belt cannot completely absorb most of electromagnetic energy, and the efficiency decreases.

In the meantime, a metal belt having a thickness greater than 100 μm has a high stiffness and a low flexibility, thus it is difficult to be used as a rotating member. If the belt is used in a belt fixing method using a ceramic heater, the thickness of the belt is preferably not more than 100 μm, more preferably not more than 50 μm, and most preferably not more than 20 μm, to reduce the heat capacity and improve its quick-start property.

It is proved, by observation of the surface etched after ground, that the crystal of the metal belt varies according to the heating temperature and the heating time. If the crystal orientation ratio is high, the crystal becomes resistant to change, less variable in hardness, and less prone to decrease in strength. The greater change of the crystal and change in the hardness under high-temperature conditions deteriorate the fatigue resistance.

(Coated Belt)

The coated belt of the present invention is formed in an endless form by electroforming, with a crystal orientation ratio $I_{(200)}/I_{(111)}$ of from 80 to 250 inclusive 80 and 250, and comprises a metal base material mainly containing nickel, and a release layer formed on an external periphery of the metal base material with at least one elastic layer intervening therebetween. The metal base material further contains 0.03 to 0.10 wt % of carbon.

As the release layer, preferable are fluorocarbon resin such as PFA (tetrafluoroethylene/perfluoroalkylether copolymer), PTFE (polytetrafluoroethylene), FEP (tetrafluoroethylene/hexafluoropropylene copolymer), silicone resin, fluorosilicone rubber, fluorine rubber and silicone rubber. In particular, PFA is preferred. According to necessity, the release layer may contain a conductive agent, such as carbon and tin oxide and so on, in an amount not more than 10 wt % of the release layer.

The thickness of the release layer is preferably 1 μm to 100 μm. If the thickness of the release layer is less than 1 μm, there may be the cases where a badly released portion is generated due to irregular coating of the coating and durability is insufficient. In the meantime, if the thickness of the release layer exceeds 100 μm, there are the cases where the heat conductivity deteriorates. In particular, in a resin-based release layer, the hardness is so increased that the elastic layer described later produces no effect.

If the release layer is manufactured by a publicly-known method, for example, if it is formed of a fluorocarbon resin-based material, it may be formed by a method of coating with a dispersed coating of fluorocarbon resin powder and drying and baking it, or a method of coating with fluorocarbon resin tubed in advance and adhering it. The release layer of rubber material can be formed by a method of injecting liquid material into a mold and curing it by heating, a method of curing liquid material by heating after extrusion, or a method of curing by heating after injection molding, etc.

Further, it is possible to form the elastic layer and the release layer simultaneously, by using a method of mounting a tube with primer-treated internal surface and an electroformed nickel belt with a primer-treated surface in a cylindrical mold, injecting liquid silicone rubber into a gap between the tube and the electroformed nickel belt, and curing and adhering the rubber by heating.

Although the elastic layer is not an indispensable constituent element of the present invention, it is preferably provided to secure a certain amount of nip width and heat capacity. As the material of the elastic layer, preferred are silicone rubber, fluorine rubber and fluorosilicone rubber, in particular, silicone rubber. Examples of the silicone rubber used for the elastic layer are polydimethylsiloxane, polymethyltrifluoropropylsiloxane, polymethylvinylsiloxane, polytrifluoropropylvinylsiloxane, polymethylphenylsiloxane, polyphenylvinylsiloxane, and copolymers of the above polysiloxane. As occasion demands, the elastic layer main contain a reinforcing filler such as dry silica and wet silica, calcium carbonate, quartz powder, zirconium silicate, clay (aluminum silicate), talc (hydrated magnesium silicate), alumina (aluminum oxide), and colcothar (ferric oxide), etc.

Because favorable fixed image quality is obtained, the thickness of the elastic layer is not less than 10 μm, preferably not less than 50 μm, and not more than 1000 μm, preferably not more than 500 μm. If a color image is printed, in particular, a photograph image, a solid image is formed over a wide area on the transfer member. In such a case, if the heating surface (the release layer) cannot follow the unevenness of the transfer member or the unevenness of the toner layer, irregular heating is caused, and brightness irregularity occurs on a part of the image with much or small heat transferred. Specifically, a part with much heat transferred has high brightness, while a part with small heat transferred has low brightness. If the elastic layer is too thin, since the heating surface cannot completely follow the unevenness of the transfer member or toner layer, image brightness irregularity may occur. Further, if the elastic layer is too thick, the heat resistance of the elastic layer is increased, and it may be difficult to realize quick start.

Although the sliding layer is not an indispensable constituent element of the present invention, it is preferably provided to reduce the driving torque to operate the fixing apparatus. Examples of the material of the sliding layer are polyimide resin, polyamideimide resin, phenol resin, fluorocarbon resin, PEEK (polyetheretherketone resin) resin, PES (polyethersulfone) resin, PPS (polyphenylene sulfide) resin, PFA (tetrafluoroethylene/perfluoroalkylether copolymer) resin, PTFE (polytetrafluoroethylene) resin, FEP (tetrafluoroethylene/hexafluoropropylene copolymer) resin, and LCP (liquid crystal polyester) resin, etc. As the occasion demands, the sliding layer may contain a sliding agent, such as fluorocarbon resin powder, graphite, and molybdenum disulfide. The sliding layer can be formed by, for example, a method of coating, drying and curing liquid material, or a method of adhering a tubed material. A sliding layer can provide heat insulation to prevent the heat generated on the metal base material as a heat-generating layer from propagating to the inside of the belt, without increasing the heat capacity of the coating belt too much. Therefore, in comparison with the case of having no sliding layer, the heat supply efficiency to the transfer member side is improved, and the power consumption can be reduced. Further, it is possible to shorten the rise time.

The thickness of the sliding layer is preferably 5 μm to 100 μm. If the thickness of the sliding layer is less than 5 μm, the durability may be insufficient. If the sliding layer has a thickness exceeding 100 μm, the heat capacity of the belt and the rise time may be increased.

DETAILED DESCRIPTION OF THE INVENTION

Various preferable examples of the present invention will now be described with reference to attached drawings.

In electroforming, a matrix (electrotype mold, mold) having conductivity, such as a cylindrical matrix made of stainless steel, is used as a cathode, and a nickel plating film is formed on the surface of the matrix by subjecting it to electroplating with a nickel plating bath. The plating film is exfoliated (removed) from the matrix, and used as a product. If the matrix is made of metal, it is subjected to surface treating for exfoliation. If the matrix is made of nonmetal, it is subjected to conductivity treatment for plating.

Figure 1:
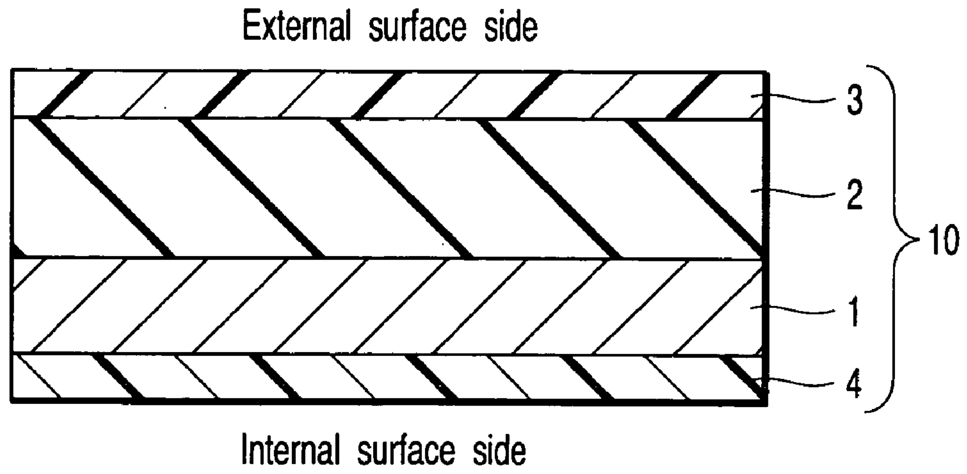
FIG. 1 is a cross-sectional view of a coated belt of the present invention.

As shown in FIG. 1, a coated belt 10 has a complex structure, comprising a metal base material 1 made of an endless metal belt serving as a base layer, an elastic layer 2 provided on an external surface of the base material 1, a release layer 3 covering an external surface of the elastic layer 2, and a sliding layer 4 covering an internal surface of the base material 1. In the coated belt 10, the sliding layer 4 is disposed on the internal surface side (belt guiding surface side), and the release layer 3 is disposed on the external surface side (pressing roller surface side). A primer layer (not shown) may be provided for adhesion between the metal base material 1 and the elastic layer 2, between the elastic layer 2 and the release layer 3, or between the metal base material 1 and the sliding layer 4. As the primer layer, publicly-known material can be used, such as silicone, epoxy, and polyamideimide, and the thickness of the primer layer is about 1 to 30 μm.

(Metal Belt: Metal Base Material)

The metal base material 1 corresponds to the metal belt of the present invention. The base material 1 is formed to be endless by electroforming, and has a crystal orientation property in which the crystal orientation ratio $I_{(200)}/I_{(111)}$ is from 80 to 250 inclusive 80 and 250 and a plane (200) is preferentially grown. Further, the metal base material 1 contains carbon of 0.03 to 0.10 wt %. Although the metal base material 1 can be used singly as a fixing belt, in normal times it is used as a coated belt 10 made by forming the release layer 3 made of fluorocarbon resin and the like on an external peripheral surface of the base material 1 directly, or with the elastic layer 2 of silicone rubber and the like intervening therebetween. The thickness, width and internal diameter of the metal belt can be set according to its uses, and are not limited to particular values. Generally, the thickness is 10 to 1000 μm, preferably 15 to 500 μm, and more preferably 20 to 100 μm. In view of balance between the heat capacity, heat conductivity, mechanical strength and flexibility, etc., the thickness is most preferably 30 to 80 μm. If it is used as a fixing belt or a transfer belt, etc. in an electrophotographic copying machine, the width of the belt can be determined according to the width of the transfer material such as transfer paper.

Brighteners are generally classified into primary brighteners and secondary brighteners. To obtain a high brightness, both of them are often used together. Among them, primary brighteners are organic compounds having a structure of $=C-SO_2-$, and examples thereof are sulfonate (aromatic sulfonate such as 1,3,6-naphthalene-trisulfonic acid trisodium salt), sulfoneimide (for example, saccharin), sulfoneamide, and sulfinic acid, etc. Among them, aromatic sulfonate is preferably used.

Examples of secondary brighteners are organic compounds having a structure selected from C=O, C=C, C≡N, C=N, C≡C, N—C=S, N=N, $-CH_2-CH-O-$, and the like. Among them, representative compounds are alkynediol, such as 2-butyne-1,4-diol, and coumarin. In the present invention, the crystal orientation ratio $I_{(200)}/I_{(111)}$ of the endless metal belt can be restricted to a desired range by adding alkynediol to a nickel sulfamate plating bath. More specifically, there is a method of adjusting the crystal orientation ratio by using, for example, aromatic sulfonate as the primary brightener and using alkynediol, for example, 2-butyne-1,4-diol, as the secondary brightener. However, the present invention is not limited to a specific method, but any method can be adopted as long as it can restrict the crystal orientation ratio $I_{(200)}/I_{(111)}$ to the above range. To restrict the carbon content of the metal base material to a desired range, a method of regulating the kinds and the addition amount of the brighteners is preferred.

(Manufacturing Method)

The metal belt is formed by electroforming, using a nickel plating bath, such as Watt bath mainly containing nickel sulfate and nickel chloride and Sulfamate bath mainly containing nickel sulfamate. Electroforming is a method of providing thick plating on a surface of a matrix, and exfoliating it from the matrix to obtain a product. To obtain the metal belt, a cylinder made of stainless steel, brass, or aluminum, etc. is used as the matrix, and a nickel plating film is formed on a surface of the matrix by using a nickel plating bath.

If the matrix is a nonconductor such as silicone resin and gypsum, it is subjected to conductivity treatment by using graphite, copper powder, silver mirror, and sputtering, etc. In electroforming to a metal matrix, to facilitate exfoliation of the nickel plating film, an exfoliation treatment is preferably performed, for example, formation of an exfoliation film, such as an oxide film, compound film and graphite-powder-applied film, on the surface of the matrix.

The nickel plating bath comprises a nickel ion source, anode resolvent, pH buffering agent, and other additives. Examples of the nickel ion source are nickel sulfamate, nickel sulfate, and nickel chloride. In Watt bath, nickel chloride functions as the anode resolvent, and ammonium chloride and nickel bromide are used as the anode resolvent in the other nickel baths.

Nickel plating is generally performed within the pH range of 3.0 to 6.2. To adjust the pH to be within the desired range, a pH buffering agent such as boric acid, formic acid, and nickel acetate is used. As other additives, brighteners, pit preventing agent, and internal-stress reducer are used, for the purpose of smoothing, preventing pits, making crystals finer, and reducing the residual stress.

With respect to the composition of the nickel plating bath, for example, the composition of a sulfamate bath comprises 300–600 g/L of nickel sulfamate, 0–30 g/L of nickel chloride, 20–40 g/L of boric acid, a proper amount of surface-active agent, and a proper amount of brightners. The pH of the bath is preferably 3.5 to 4.5, and the temperature of the bath is preferably 40 to 60° C. The current density is preferably 0.5 to 15 A/$dm^2$, and 3 to 40 A/$dm^2$ in a bath of a high concentration.

(Release Layer)

The release layer 3 is generally formed of heat-resistant resin having releasing property, such as fluorocarbon resin, polyimide resin, and polyamideimide resin. If desired, it can be a rubber layer or rubber composition layer having releasing property and elasticity, such as silicone rubber, fluorine rubber, or a mixture of fluorine rubber and fluorocarbon resin, and a mixture of silicone rubber and fluorocarbon resin. In the case of adopting the latter, an elastic layer can be omitted, since the release layer has elasticity.

If the release layer is a heat-resistant resin layer, the thickness of the layer is generally 0.1 to 150 μm, preferably 1 to 100 μm, and more preferably 5 to 50 μm. If the release layer is a rubber layer having elasticity, the thickness thereof is 10 μm to 5 mm, preferably 20 μm to 3 mm. The width and the external diameter of the coated belt can be set according to use of the belt.

As described above, the release layer is usually formed of heat-resistant resin having releasing property, such as fluorocarbon resin. If desired, it can be a rubber layer or rubber composition layer having releasing property and elasticity, such as silicone rubber, fluorine rubber, or a mixture of fluorine rubber and fluorocarbon resin, and a mixture of silicone rubber and fluorocarbon resin.

As the heat-resistant resin, preferred is a resin having such heat resistance that it does not melt or softened and does not substantially deteriorate, even if it is continuously used at a temperature of 150° C. or more. On the assumption that the coated belt of the present invention is used as a fixing belt and the like under high-temperature conditions, the heat-resistant resin is more preferably a synthetic resin having heat resistance and being continuously usable at a high temperature of 200° C. or more. Examples of such a heat-resistant resin are fluorocarbon resin, polyimide resin, polyamideimide resin, polyethersulfone resin, polyetherketone resin, polybenzimidazole resin, polybenzoxazole resin, polyphenylenesulfide resin, and Bismaleimide resin. Among them, fluorocarbon resin is particularly preferable for its excellent heat resistance and releasing property.

Examples of fluorocarbon resin are polytetrafluoroethylene (PTFE), tetrafluoroethylene/perfluoroalkylvinylether copolymer (PFA), tetrafluoroethylene/hexafluoropropylene copolymer (FEP), ethylene/tetrafluoroethylene copolymer (ETFE), polychlorotrifluoroethylene (PCTFE), ethylene/chlorotrifluoroethylene copolymer (ECTFE), and polyvinylidene fluoride (PVDF), etc.

Each of the fluorocarbon resins can be used singly, or at least two of them can be used in combination. If the coated belt is used as a fixing belt or a pressing belt, PTFE and PFA are preferred among the fluorocarbon resins, in view of the heat resistance. Further, PFA is more preferred, since it has flowability in molten state and a fluorocarbon resin coating having excellent surface smoothness can easily be obtained.

Although the fluorocarbon resin can be used in the form of liquid fluorocarbon resin coating, it is preferably used in powder form (powder coating) to improve formability and releasing property. Although the average grain size of the fluorocarbon resin powder is not particularly limited, it is preferably not more than 10 μm to form a thin coating with even thickness by means of powder coating. The lower limit of the average grain size is generally around 1 μm. In particular, it is preferred to use PFA powder having an average grain size of 10 μm or less. To coat fluorocarbon resin powder, various general-purpose powder coating methods are available. Among them, an electrostatic coating (electrostatic powder spraying), in which powder is charged with electricity and applied, is preferably used since it can form a uniform and firm powder coating layer.

The fluorocarbon resin is applied onto the endless metal belt base material, and then baked by a publicly-known method. If an elastic layer is disposed between the fluorocarbon resin layer and the endless metal belt, fluorocarbon resin may be applied and baked, after an elastic layer is formed on the endless metal belt base material or endless metal belt having internal surface coated in advance. However, in a preferred method, a thin (not more than 30 μm) fluorocarbon resin tube whose internal surface is treated in advance (to improve its adhesiveness) is fitted in a cylindrical mold so as not to become wrinkled, and an endless metal belt base material on which an elastic layer is formed or an endless metal belt having a coated internal surface is held in a core of the columnar or cylindrical mold and inserted into the fluorocarbon resin tube. Then, adhesive (liquid silicone rubber) is injected into the space between the tube and the elastic layer, smoothed and heated. The thickness of the fluorocarbon resin coating after baking is generally 0.1 to 150 μm, preferably 1 to 100 μm, and more preferably 5 to 50 μm. If the elastic layer is disposed under the release layer the thickness of the fluorocarbon resin coating can be set to 30 μm or less, to make full use of flexibility of the elastic layer.

By using fluorocarbon resin having a tube form, a fluorocarbon resin layer having excellent surface smoothness and releasing property can be formed.

(Elastic Layer)

The elastic layer 2 is not indispensable, but an optional constituent element in the present invention. Therefore, the coated belt 10 may have a three-layer structure of the release layer 3/metal base material 1/sliding layer 4, or a two-layer structure of release layer 3/metal base material 1. In particular, if the belt is used for heating and fixing of monochrome images, in which the amount of toner mounted on the transfer member is small and unevenness of the toner layer is relatively low, the coated belt 10 may have a three-layer or two-layer structure with no elastic layer 2.

If the elastic layer 2 is provided, although one elastic layer suffices, two or more layers may be provided as the occasion demands. The material of the elastic layer 2 is preferably a rubber material having excellent heat resistance, such as silicone rubber and fluorine rubber. It is also possible to use a rubber composition obtained by mixing fluorocarbon resin with rubber such as silicone rubber and fluorine rubber. Using such material adheres a plurality of elastic layers to each other more closely.

The thickness of the elastic layer 2 (if there are two or more elastic layers, the total thickness thereof) can be set according to its use, and is not limited to a specific value. If it is used in a fixing belt and the like of an image forming apparatus, the thickness is generally 20 to 1000 μm, preferably 150 to 450 μm.

The rubber material used for formation of the elastic layer 2 is a rubber having excellent heat resistance, such as silicone rubber and fluorine rubber. The term "heat-resistant rubber" indicates rubber having enough heat resistance to withstand continuous use at a fixing temperature, if the coated belt is used as the fixing belt and the pressing belt. Specifically, a rubber material is preferred which neither melts nor is softened and does not substantially deteriorate, even if it is continuously used at a temperature of 150° C. or more.

The rubber material is preferably a millable or liquid silicone rubber, fluorine rubber, or a mixture thereof, since they have particularly excellent heat resistance. Examples of the rubber material are: silicone rubber such as dimethylsilicone rubber, fluorosilicone rubber, methylphenylsilicone rubber, and vinyl silicone rubber; and fluorine rubber such as fluorine vinylidene rubber, tetrafluoroethylene-propylene rubber, tetrafluoroethylene-perfluoromethylvinylether rubber, phosphazene-based fluorine rubber, and fluoropolyether rubber. Among them, liquid silicone rubber which is easily injected into the mold is preferably used. The rubbers can be used singly, or two or more rubbers can be used in combination.

(Sliding Layer)

If the sliding layer 4 is formed on the internal peripheral surface of the belt, polyimide varnish is applied to the internal surface of the endless metal belt base material. After drying, the varnish is heated and thereby dehydrated and the ring is closed (imidized). If the heat-resistant resin is thermoplastic resin, a solution thereof is applied and dried. The thickness of the sliding layer 4 is preferably adjusted in the same manner as in the case of the release layer 3. The thickness of the sliding layer 4 is 5 μm to 100 μm, especially preferably 10 μm to 60 μm. If the sliding layer 4 is excessively thin, the durability may be insufficient. If the sliding layer 4 is excessively thick, the rise time is increased. The sliding layer 4 may contain a sliding agent, such as fluorocarbon resin powder, graphite, and molybdenum disulfide, as the occasion demands.

EXAMPLE 1

As a metal base material of Example 1, a metal belt sample A shown in FIG. 1 with an internal diameter of 34 mm and thickness of 50 μm was manufactured. Then, silicone rubber as the elastic layer 2 with a thickness of 300 μm, and a PFA tube as the release layer 3 with a thickness of 30 μm were layered thereon, with a primer intervening between layers. Further, a polyimide resin layer with a thickness of 10 μm was layered thereon as the sliding layer 4, and a coated belt was obtained.

In manufacturing of the metal base material (metal belt), first, an aqueous solution bath containing 500 g/l of nickel sulfamate tetrahydrate and 35 g/l of boric acid was prepared as the electrolytic bath. Then, the aqueous solution was subjected to electrorefining with a low current, while being filtered by using a 0.5 μm filter in a vessel filled with activated carbon. Next, the activated carbon was removed from the vessel, a pit inhibitor of a necessary amount was added to the solution, and then 0.3 g/l of 1,3,6-naphthalenetrisulfonic acid trisodium salt serving as the primary brightener and 100 mg/l of 2-butyne-1,4-diol serving as the secondary brightener were added to the solution.

By using the electrolytic bath obtained, electroforming was performed at a predetermined bath temperature and a current density of 10.5 A/dm$^2$, with a stainless matrix used as a cathode, and thereby an electrodeposited member having an internal diameter of 34 mm and thickness of 50 μm was formed. After being washed by pure water, the electrodeposited member was removed from the matrix, and used as the metal base material.

The crystal orientation ratio $I_{(200)}/I_{(111)}$ of the obtained metal belt (sample A) was obtained by measuring the X-ray diffraction intensities of a plane (200) (d value=0.17620 nm) and a plane (111) (d value=0.20340 nm) by means of wide-angle X-ray diffraction method with "PRINT 2100 Ultima$^+$/PC (analysis software: JADE)" (trade name), which is an X-ray diffractometer manufactured by RIGAKU DENKI Corporation, and obtaining a rate of integral intensity of them.

The carbon content and sulfur content in the metal belt were determined by method of high-frequency heating and combustion in oxygen flow/infrared-radiation. The method of high-frequency heating and combustion in oxygen flow/infrared-radiation is a method, in which a sample is heated and oxidized in an oxygen flow to oxidize carbon in the sample to carbon dioxide and carbon monoxide and oxidize sulfur in the sample to sulfur dioxide, the flow is introduced into an infrared detector at a fixed flow rate, and the carbon concentration in the sample is calculated on the basis of the detected carbon dioxide and carbon monoxide, and the sulfur concentration is calculated on the basis of the detected sulfur dioxide. A calibration curve is formed by measuring a blank and a reference material. The carbon content of sample A of Example 1 was 0.030 wt %, and the crystal orientation ratio thereof was 113.

TABLE 1

| Sample | SN (g/L) | BA (g/L) | Primary brightner (g/L) | Secondary brightner (g/L) | Current density (A/dm2) | Electro-deposition stress (releasing property) | Carbon content (wt %) | Crystal orientation ratio | Number of repetition durability times | Evaluation |
|---|---|---|---|---|---|---|---|---|---|---|
| A (Example 1) | 500 | 35.0 | 0.3 | 100 | 10.5 | Passed | 0.030 | 113 | about 250,000 | ○ |

TABLE 1-continued

| Sample | SN (g/L) | BA (g/L) | Primary brightner (g/L) | Secondary brightner (g/L) | Current density (A/dm2) | Electro-deposition stress (releasing property) | Carbon content (wt %) | Crystal orientation ratio | Number of repetition durability times | Evaluation |
|---|---|---|---|---|---|---|---|---|---|---|
| B (Example 2) | 500 | 35.0 | 0.3 | 120 | 10.5 | Passed | 0.034 | 132 | about 390,000 | ○ |
| C (Example 3) | 500 | 35.0 | 0.3 | 180 | 10.5 | Passed | 0.049 | 169 | 1,000,000 | ○ |
| D (Example 4) | 500 | 35.0 | 0.3 | 180 | 8.9 | Passed | 0.061 | 246 | 1,000,000 | ○ |
| E (Example 5) | 500 | 35.0 | 0.3 | 180 | 7.9 | Passed | 0.070 | 198 | 1,000,000 | ○ |
| F (Example 6) | 500 | 35.0 | 0.3 | 180 | 5.8 | Passed | 0.084 | 147 | 1,000,000 | ○ |
| G (Example 7) | 500 | 35.0 | 0.3 | 180 | 5.3 | Passed | 0.088 | 114 | 1,000,000 | ○ |
| H (Comparative Example 1) | 500 | 35.0 | 0.3 | 0 | 10.5 | Passed | 0.0076 | 15 | about 130,000 | X |
| I (Comparative Example 2) | 500 | 35.0 | 0.3 | 60 | 10.5 | Passed | 0.019 | 50 | about 130,000 | X |
| J (Comparative Example 3) | 500 | 35.0 | 0.3 | 180 | 0.5 | Not passed | 0.14 | Unmeasurable | Unmeasurable | X |

SN: nickel sulfamate tetrahydrate
BA: boric acid
Primary brightener: 1,3,6-naphthalene-trisulfonic acid trisodium salt
Secondary brightener: 2-butyne-1,4-diol

EXAMPLE 2

As a metal base material of Example 2, a metal belt sample B shown in Table 1 was manufactured with an internal diameter of 34 mm and a thickness of 50 μm.

The metal belt was manufactured under the same conditions as those of Example 1, except the addition amount of the second brightener. In manufacturing of sample B, 120 mg/l of 2-butyne-1,4-diol was added as the second brightener. The carbon content of the sample B was 0.034 wt %, and the crystal orientation ratio thereof was 132.

EXAMPLE 3

As a metal base material of Example 3, a metal belt sample C shown in Table 1 was manufactured with an internal diameter of 34 mm and a thickness of 50 μm.

The metal belt was manufactured under the same conditions as those of Example 1, except the addition amount of the second brightener. In manufacturing of sample C, 180 mg/l of 2-butyne-1,4-diol was added as the second brightener. The carbon content of the sample C was 0.049 wt %, and the crystal orientation ratio thereof was 169.

EXAMPLE 4

As a metal base material of Example 4, a metal belt sample D shown in Table 1 was manufactured with an internal diameter of 34 mm and a thickness of 50 μm.

The metal belt was manufactured under the same conditions as those of Example 1, except the addition amount of the second brightener and the current density. In manufacturing of sample D, 180 mg/l of 2-butyne-1,4-diol was added as the second brightener. The current density was set to 8.9 $A/dm^2$. The carbon content of the sample D was 0.061 wt %, and the crystal orientation ratio thereof was 246.

EXAMPLE 5

As a metal base material of Example 5, a metal belt sample E shown in Table 1 was manufactured with an internal diameter of 34 mm and a thickness of 50 μm.

The metal belt was manufactured under the same conditions as those of Example 1, except the addition amount of the second brightener and the current density. In manufacturing of sample E, 180 mg/l of 2-butyne-1,4-diol was added as the second brightener. The current density was set to 7.9 $A/dm^2$. The carbon content of the sample E was 0.070 wt %, and the crystal orientation ratio thereof was 198.

EXAMPLE 6

As a metal base material of Example 6, a metal belt sample F shown in Table 1 was manufactured with an internal diameter of 34 mm and a thickness of 50 μm.

The metal belt was manufactured under the same conditions as those of Example 1, except the addition amount of the second brightener and the current density. In manufacturing of sample F, 180 mg/l of 2-butyne-1,4-diol was added as the second brightener. The current density was set to 5.8 $A/dm^2$. The carbon content of the sample F was 0.084 wt %, and the crystal orientation ratio thereof was 147.

EXAMPLE 7

As a metal base material of Example 7, a metal belt sample G shown in Table 1 was manufactured with an internal diameter of 34 mm and a thickness of 50 μm.

The metal belt was manufactured under the same conditions as those of Example 1, except the addition amount of the second brightener and the current density. In manufacturing of sample G, 180 mg/l of 2-butyne-1,4-diol was added as the second brightener. The current density was set to 5.3 $A/dm^2$. The carbon content of the sample G was 0.088 wt %, and the crystal orientation ratio thereof was 114.

Comparative Example 1

As a metal base material of Comparative Example 1, a metal belt sample H shown in Table 1 was manufactured with an internal diameter of 34 mm and a thickness of 50 μm. In the Comparative Example 1, 2-butyne-1,4-diol, the second brightener, was not added. The other conditions thereof were the same as those of Example 1. The carbon content of the sample H was 0.0076 wt %, and the crystal orientation ratio thereof was 15.

Comparative Example 2

As a metal base material of Comparative Example 2, a metal belt sample I shown in Table 1 was manufactured with an internal diameter of 34 mm and a thickness of 50 μm. In the Comparative Example 2, 60 mg/l of 2-butyne-1,4-diol was added as the second brightener. The other conditions thereof were the same as those of Example 1. The carbon content of the sample I was 0.019 wt %, and the crystal orientation ratio thereof was 59.

Comparative Example 3

As a metal base material of Comparative Example 3, a metal belt sample J shown in Table 1 was manufactured with an internal diameter of 34 mm and a thickness of 50 μm. In the Comparative Example 3, 180 mg/l of 2-butyne-1,4-diol was added as the second brightener, and the current density was set to 0.5 $A/dm^2$. No sound electrodeposited member was formed in Comparative Example 3, and thus the crystal orientation ratio of sample J couldn't be measured. The carbon content of the sample J was 0.14 wt %.

Figure 2:
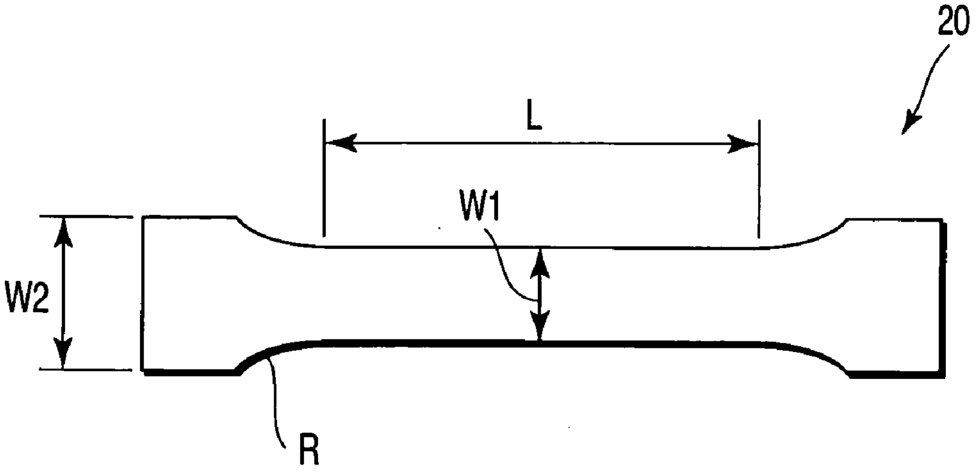
FIG. 2 is a diagram illustrating a test piece used for an evaluation test of a metal belt of the present invention.

A test piece 20 shown in FIG. 2 was extracted from each of the endless metal belts obtained as described above, and each test piece was subjected to a durability test. As a test piece 20 for a metal material tensile test, a test piece of No. 13B defined under JIS Z2201 was used. The following are dimensions of the parts of the test piece 20.

Parallel portion width W1: 12.5 mm

Parallel portion length L: 60 mm

Bench marks interval: 50 mm

Shoulder portion radius R: 20 mm

Grip portion width W2: 20 mm

The following are conditions of the durability test.

Maximum repeated load: 550 $N/mm^2$

Minimum repeated load: 80 $N/mm^2$

Atmosphere temperature: 250° C.

Repetition cycle: 15 Hz

Figure 3:
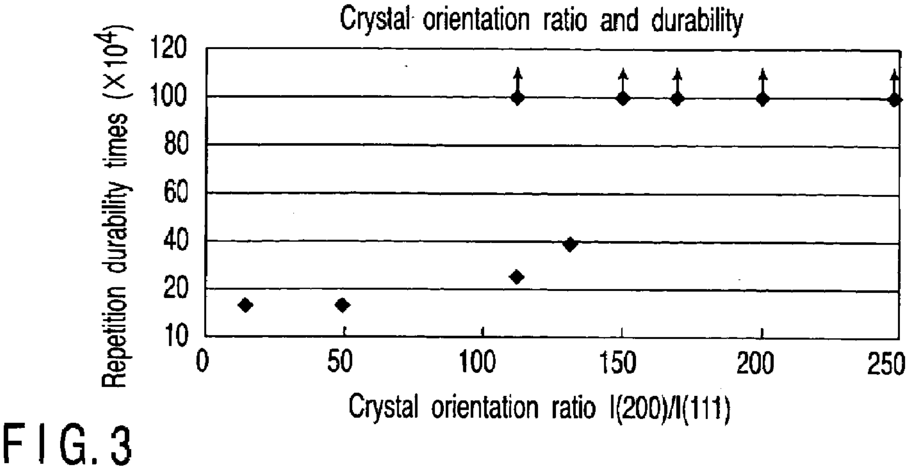
FIG. 3 is a characteristic diagram illustrating a relationship between a crystal orientation ratio and number of repetition durability times in the metal belt of the present invention.

As shown in FIG. 3 and Table 1, the number of repetition durability times of each sample was obtained by the fatigue test at high temperature. The numbers of repetition durability times of samples H and I of comparative examples 1 and 2, having the crystal orientation ratio $I_{(200)}/I_{(111)}$ of less than 50, were about 130,000, which was small and did not reach the acceptable level, 200,000. In the meantime, the number of repetition durability times of samples A–G of Examples 1–7, having the crystal orientation ratios $I_{(200)}/I_{(111)}$ of 113, 132, 169, 246, 198, 147 and 114, respectively, were about 250,000, 390,000, not less than 1,000,000, not less than 1,000,000, not less than 1,000,000, not less than 1,000,000, and not less than 1,000,000, respectively, which were much larger than 200,000 times, the acceptable level. Samples having the crystal orientation ratio of around 100 tend to have varying number of repetition durability times. As the crystal orientation ratio of the belt increases, the number of repetition durability times thereof tends to increase and be less variable. The crystal orientation ratio of sample J in Comparative Example 3 could not be measured, since the film was not formed soundly in sample J.

Figure 4:
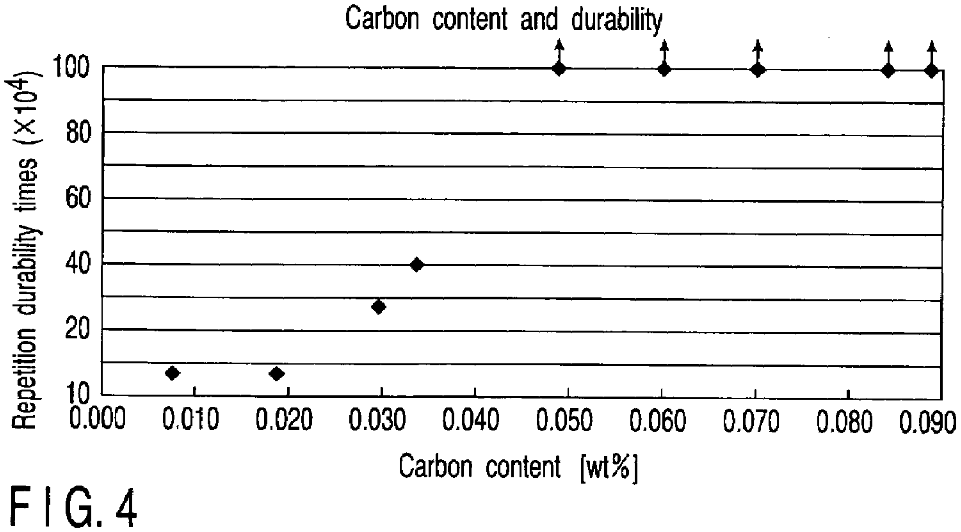
FIG. 4 is a characteristic diagram illustrating a relationship between a carbon content and number of repetition durability times in the metal belt of the present invention.

As shown in FIG. 4 and Table 1, in Examples 1–7, the carbon contents (wt %) of samples A, B, C, D, E, F and G were 0.030, 0.034, 0.049, 0.061, 0.070, 0.084, and 0.088, respectively. The numbers of repetition durability times of the samples were good as described above.

Figure 5:
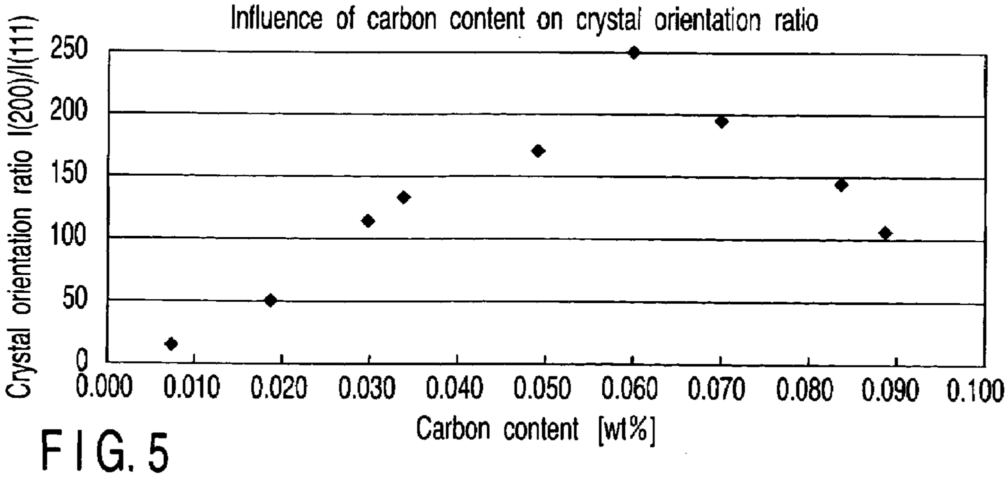
FIG. 5 is a characteristic diagram illustrating a relationship between the carbon content and the crystal orientation ratio $I_{(200)}/I_{(111)}$ in the metal belt of the present invention.

Further, with respect to the relationship between the carbon content and the orientation ratio, as shown in FIG. 5 and Table 1, the crystal orientation ratio increased gradually, 113, 132, 169, and 246, as the carbon content (wt %) gradually increased, 0.030, 0.034, 0.049 and 0.061, among Examples 1–4 (samples A, B, C and D). However, when the carbon content (wt %) further increased, 0.070, 0.084 and 0.088 as among Examples 5–7 (samples E, F and G), the crystal orientation ratio gradually decreased, 198, 147, and 114.

In the meantime, the carbon contents of Comparative Examples 1 and 2 (samples H and I) were 0.0076% and 0.019%, respectively, and their crystal orientation ratios were small, 15 and 50, respectively. The carbon content (wt %) of Comparative Example 3 was 0.14%, and its crystal orientation ratio could not be measured.

In each of Examples 1–7, as described above, it was found that the number of repetition durability times greatly exceeded the allowable level, 200,000 times, and that there was an obvious correlation between the carbon content and the orientation ratio.

The above are the results of the evaluation test performed for the metal belt. A coated belt having the metal belt as the metal base material can be evaluated by the same test.

The belt of the present invention has an excellent durability and a long life, since it has the crystal orientation in which the crystal orientation ratio $I_{(200)}/I_{(111)}$ is from 80 to 250 inclusive 80 and 250 and the plane (200) is preferentially grown. Further, since the carbon content of the belt of the present invention is set to a specific range, the belt has an excellent durability, enables easy removal of the electroformed product thereof from the matrix, and avoids occurring of partial exfoliation of the electroformed member from the matrix. Therefore, the metal belt and the coated belt of the present invention are suitably used as a fixing belt in an image forming apparatus, such as an electrophotographic copying machine.

What is claimed is:

1. A metal belt being formed to be endless by electroforming, and mainly containing nickel, wherein said belt comprises a crystal orientation in which a crystal orientation ratio $I_{(200)}/I_{(111)}$ is not less than 113 and not more than 250.

2. The metal belt according to claim 1, wherein the belt has a carbon content of 0.03 to 0.10 wt %.

3. The metal belt according to claim 1, wherein the belt is substantially free of manganese.

4. A coated belt comprising:

a metal base material being formed to be endless by electroforming, having a crystal orientation in which a crystal orientation ratio $I_{(200)}/I_{(111)}$ is not less than 113 and not more than 250, and mainly containing nickel; and a release layer formed on an external periphery of the metal base material directly, or with at least one elastic layer intervening therebetween.

5. The coated belt according to claim 4, wherein the metal base material has a carbon content of 0.03 to 0.10 wt %.

6. The coated belt according to claim 4, wherein the metal base material is substantially free of manganese.

* * * * *